J. A. CLUXTON.
Post-Hole Diggers.
No. 196,195.    Patented Oct. 16, 1877.
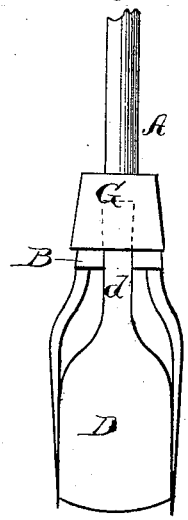
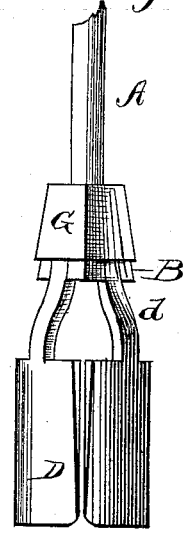
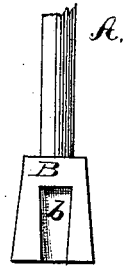

UNITED STATES PATENT OFFICE.

JOHN A. CLUXTON, OF BENTONVILLE, OHIO.

IMPROVEMENT IN POST-HOLE DIGGERS.

Specification forming part of Letters Patent No. 196,195, dated October 16, 1877; application filed June 6, 1877.

*To all whom it may concern:*

Be it known that I, JOHN A. CLUXTON, of Bentonville, in the county of Adams and State of Ohio, have invented certain new and useful Improvements in Post-Hole Diggers; and I do hereby declare that the following is a full, clear, and exact description thereof, reference being had to the accompanying drawings, and to the letters of reference marked thereon, which form part of this specification.

The nature of my invention consists in the construction and arrangement of a device for digging holes for setting posts or digging ditches, trenches, &c., as will be hereinafter more fully set forth.

In order to enable others skilled in the art to which my invention appertains to make and use the same, I will now proceed to describe its construction and operation, referring to the annexed drawing, in which—

Figure 1 is a side elevation of my invention with straight spades. Fig. 2 is a side elevation, showing curved spades; and Fig. 3 is a side view of the block B.

A represents the handle, upon the end of which is firmly fastened a solid cast-iron block, B. This block has four sides, and is made slightly tapering, as shown, the sides at the base being wider than at the top.

In each side of the block B is made a central longitudinal groove, *b*, also made slightly tapering, but in reverse direction from that of the block—that is to say, its upper end being wider than the bottom.

D D represent the spades, which are provided with shanks *d*, corresponding in size and shape with the grooves *b* in the block B, and said shanks are placed in said grooves, and held therein by slipping a sheet-metal sleeve, G, downward over the block, said sleeve being of the same shape and size as the block. There is one of these spades on each side of the block, and the tapering grooves and shanks prevent them from falling out.

The spades D may be made straight for making square holes, or they may be made curved, so that when put together a round hole may be made.

I am aware that post-hole diggers constructed of four shovels or spades removably connected to a handle are not new, and I do, therefore, not claim such, broadly, as being my invention.

Having thus fully described my invention, what I claim as new, and desire to secure by Letters Patent, is—

In a post-hole digger, the tapering four-sided block B, provided with longitudinal slots *b*, tapering in reverse direction, in combination with the spades D, having tapering shanks *d*, and the sliding or movable sleeve G, all constructed substantially as and for the purposes herein set forth.

In testimony that I claim the foregoing as my own I affix my signature in presence of two witnesses.

JOHN A. CLUXTON.

Witnesses:
 LUTHER THOMPSON,
 SAML. BURWELL.